Dec. 12, 1939.     R. R. RIESZ     2,183,248
WAVE TRANSLATION
Filed Sept. 11, 1936     3 Sheets-Sheet 1
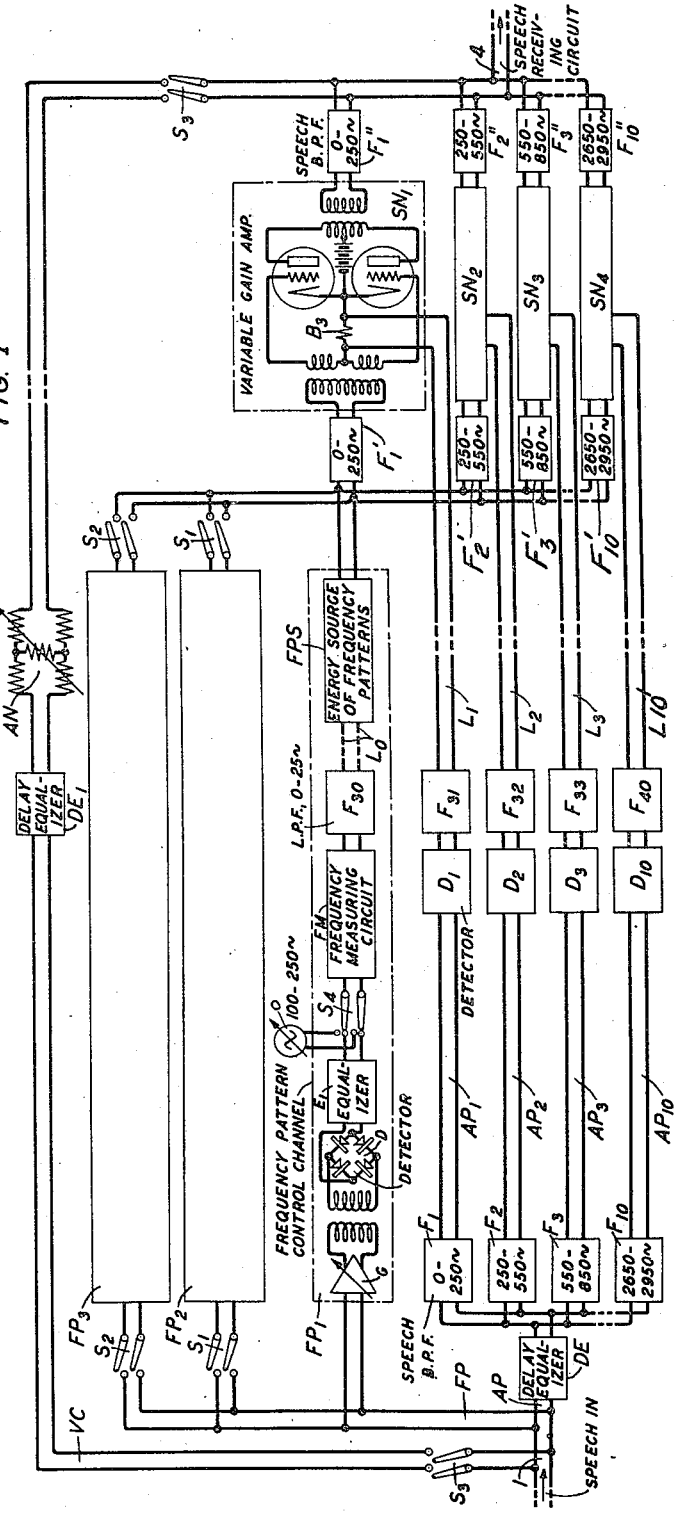
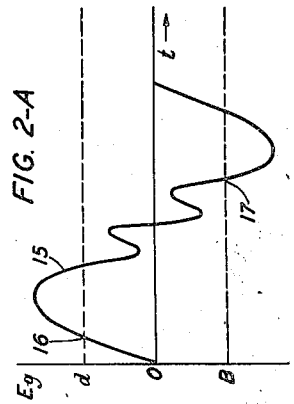
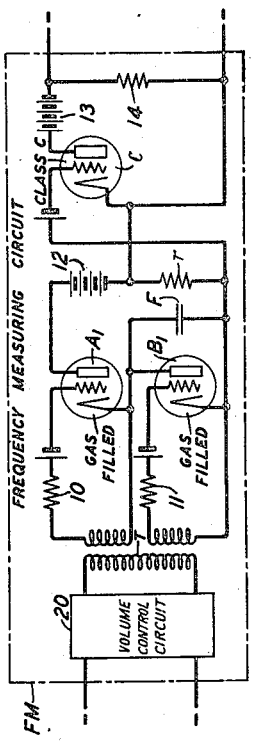
INVENTOR
R. R. RIESZ
BY
ATTORNEY Dec. 12, 1939.  R. R. RIESZ  2,183,248
WAVE TRANSLATION
Filed Sept. 11, 1936   3 Sheets-Sheet 2

INVENTOR
R. R. RIESZ
BY
*H.A.Burgers*
ATTORNEY

Dec. 12, 1939.  R. R. RIESZ  2,183,248
WAVE TRANSLATION
Filed Sept. 11, 1936  3 Sheets-Sheet 3
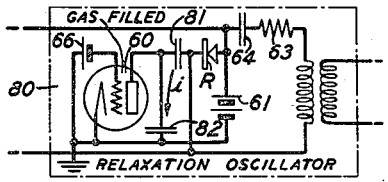
FIG. 4
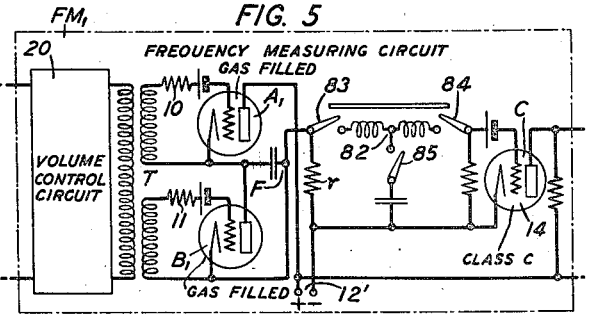
FIG. 5
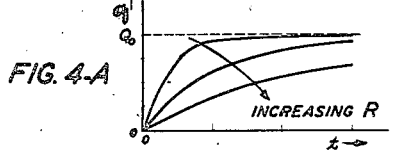
FIG. 4-A
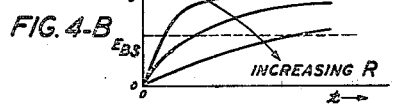
FIG. 4-B
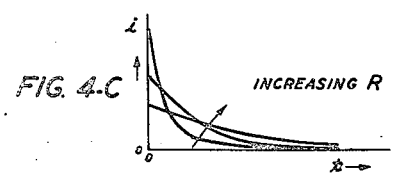
FIG. 4-C
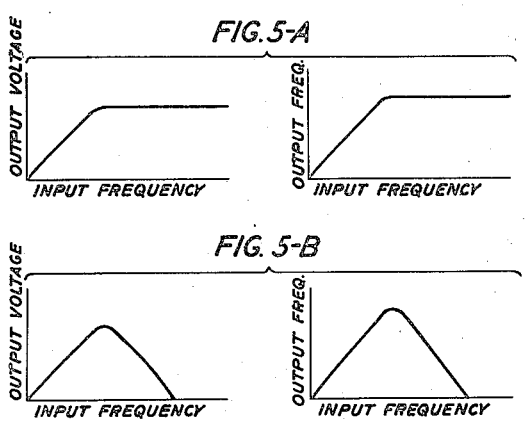
FIG. 5-A
FIG. 5-B
FIG. 6
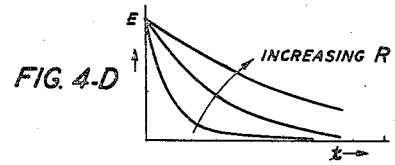
FIG. 4-D
FIG. 4-E
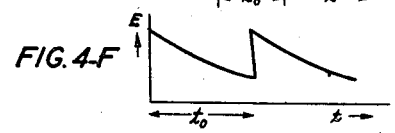
FIG. 4-F
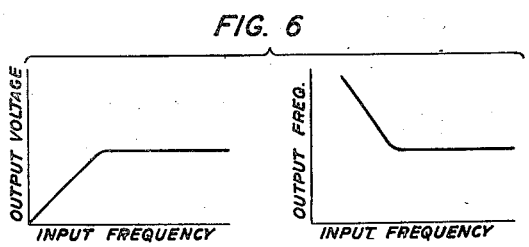
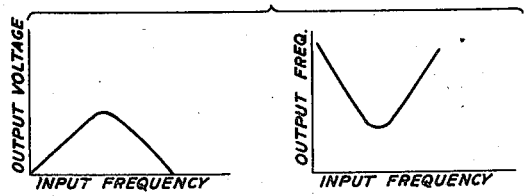
FIG. 7
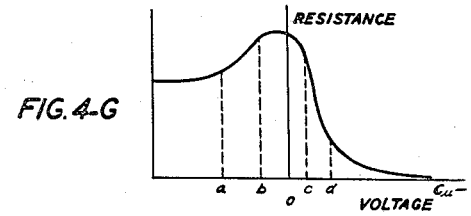
FIG. 4-G
INVENTOR
R. R. RIESZ
BY
ATTORNEY Patented Dec. 12, 1939

2,183,248

UNITED STATES PATENT OFFICE 2,183,248

WAVE TRANSLATION

Robert R. Riesz, Mount Vernon, N. Y., assignor to Bell Telephone Laboratories, Incorporated, New York, N. Y., a corporation of New York Application September 11, 1936, Serial No. 100,291

21 Claims. (Cl. 179—1.5)

This invention relates to wave translation, especially in connection with audible or sound effects.

Objects of the invention are analysis, synthesis, production, reproduction, reconstruction, simulation, imitation, modification and control of sounds and waves representing sounds, especially speech sounds and vocal effects of usual and unusual character.

Objects of the invention are also frequency range reduction and privacy in communication, especially in speech signaling and sound transmission systems.

Specific aspects of the invention are controlling the character of synthesized or reconstructed speech by artificially modifying the fundamental period of the speech (relatively to the speech duration) while maintaining the fundamental frequency variable or substantially greater than zero.

For example, in accordance with a feature of the invention, speech with a ventriloquistic touch or other desired characteristic can thus be artificially produced, for instance, by artificially making a suitable change in the fundamental frequency of ordinary speech so that a person talking in an ordinary voice gives rise to sounds that have the ventriloquistic or other chosen characteristic.

In one specific aspect the invention is a frequency range reducing and restoring system of a general type disclosed in H. W. Dudley, Patent No. 2,151,091, March 21, 1939. As brought out in that patent, speech of prescribed character, for example speech of usual character or speech of unusual character, such for instance as a whisper or a chant, can be artificially produced, or manufactured or synthesized, with the aid of information as to the frequency pattern and the amplitude pattern, or in other words information as to the three fundamental characteristics, pitch, resonant frequency regions and loudness, of the speech sounds desired; and these three characteristics can be determined or obtained for any particular set of speech signals by instantaneous analysis of the speech signals, so that speech signals so analyzed can be synthesized or artificially reconstructed or reproduced. Moreover, as also brought out in that patent, speech can be reconstructed with prescribed modification in character or vocal effects. For example, as there brought out, speech can be manufactured or artificially created from energy having either a continuous frequency spectrum or a discrete frequency spectrum, or from both types of energy, by relatively varying the time flow of energy in frequency subbands of the spectrum substantially in accordance with the relative variations of the time flow of energy that are characteristic of respectively corresponding subbands of the frequency components of speech sounds to be created, for instance speech sounds that have been analyzed with a view to their reproduction or reconstruction; and the character or expression or vocal effect of the specific sounds created depends on the fundamental frequency of the energy spectrum used to create them, for example the manufactured speech having the monotone of a chant when the fundamental frequency is maintained at a fixed value such as the average vocal cord frequency, or having the sound of a whisper when the fundamental frequency approaches zero, i. e. when the energy spectrum is continuous or in other words when there is a continuous spectrum of energy. (Energy having a continuous frequency spectrum or frequency pattern can be viewed as energy with its fundamental frequency infinitesimal or substantially zero, or in other words can be viewed practically as substantially energy with no fundamental frequency present.)

The present invention will be described hereinafter with particular reference to its above-mentioned aspect as a frequency range reducing and restoring system, the system shown herein being one example of a system affording suitable control of the fundamental frequency of the voiced sounds of speech or other vocal sounds to determine the character or effects of the speech or sounds produced by the system. In this system a speech signal is analyzed for its fundamental frequency and the average power in some ten properly chosen subbands of frequency, this information being transmitted to the receiving or reproducing end of the system and there used to fashion waves from a local multi-frequency source into a simulation of the signal.

To fashion the simulation of the signal from the waves supplied by the local source, frequency subbands of those waves are selected which are respectively coextensive with the chosen subbands of the speech signal, and the average power in each subband of the locally supplied waves is varied in accordance with the power in the corresponding chosen subband of the signal wave. This variation is effected in response to the information transmitted from the sending or analyzing end of the system regarding the average power in chosen subbands of the signal wave.

The local source provided preferably is such as to take account of the fact that two types of power spectra or frequency patterns of energy are used alternately in speech, (1) a discrete spectrum with a variable fundamental frequency and all of its upper harmonics up to several thousand cycles per second, and (2) a continuous spectrum—(a limiting case of the discrete type of spectrum when the fundamental frequency of the discrete spectrum approaches zero). To take account of this the local source is made such that the waves supplied by it can have either type of power spectrum and the type and the fundamental frequency can be varied in response to the information transmitted from the sending end or analyzing end of the system regarding the presence or absence of a fundamental frequency in the speech wave and the magnitude of any such fundamental frequency.

The variation of the fundamental frequency is made the same as in the original speech, when normal reproduction of speech is desired; or in other words, when normal reproduction of speech is desired the value of the ratio between the fundamental frequency set up at the reproducing end of the system and the fundamental frequency of the input at the sending or analyzing end is maintained at unity. However, in accordance with features of the invention the system is provided with manually or automatically operated controls whereby the value of the ratio may be made to undergo changes or deviations from unity, or the fundamental frequency of the speech or vocal sounds may be made to undergo modifications, suitable for producing prescribed modifications in the speech or vocal sound effects. The modifications may, for example, be such as to give rise to odd voice effects which simulate effects commonly observed in human voices. For instance, a person can talk in an ordinary voice and yet give rise to sounds that have the above-mentioned ventriloquistic touch, an effect commonly heard in animated cartoon "talkies" or sound motion pictures of the animated cartoon type. With this particular system in a given adjustment he can always get exactly this effect with the uniformity of machine production. Again a single person, though talking in a normal voice, can produce a variety of different voices, for example, by adjusting the controls for the fundamental frequency or having a control operator do so. These effects can be picked up so as to emphasize the desired effect and still retain good intelligibility, and are useful, for example, for producing numerous vocal imitations, popular for instance in children's "talkies" or sound pictures.

A few examples of such imitations or effects, together with particular modifications of the fundamental frequency which can be used to produce them are noted below:

Voice imitations

1. *Chanting, or monotone.*—The rather high pitched chant is obtained by using a fixed rather high frequency for the fundamental.

2. *Whisper.*—A whisper is obtained when the voice is manufactured out of energy having a continuous spectrum, for example, resistance noise. (As indicated above, this corresponds to a fundamental frequency approaching zero, or practically to substantially a lack of fundamental.)

3. *Ventriloquistic.*—Setting the controls for about a doubling of the fundamental frequency with even greater ratios at higher frequency can give a good ventriloquistic voice.

4. *Nasal.*—Adjusting the system to produce a fundamental frequency about six cycles per second lower than the applied fundamental frequency can give a strongly nasal effect.

5. *Southern drawl.*—If the output fundamental frequency is made appreciably lower than the input fundamental frequency, a roaring effect is obtained such as one associates with animals of the jungle. If the talker is permitted to hear this manufactured speech as side-tone, he slows up and produces a sort of Southern drawl, provided the frequency reduction is not too great.

6. *Squeak—drunken man's hiccup effect.*—A close imitation of a drunken man giving a hiccup on every few words can be obtained by having the fundamental frequency about one hundred per cent higher than normal.

7. *Voice breaking in an adolescent—also the cracked voice of a singer.*—This can be obtained by adjusting the system so that it substitutes a continuous type of spectrum for a discrete type at times when the input fundamental frequency is weak.

8. *Talker chewing gum.*—This effect can be obtained by making the fundamental frequency wander up and down from a 1:1 reproduction ratio.

9. *Crying child.*—This effect can be obtained by adjusting the system so that when the input fundamental frequency assumes its higher values the output fundamental frequency increases by a very large factor, and at the highest values of the input fundamental frequency transmission is interrupted, (the system then delivering no energy of either a continuous spectrum or a discrete spectrum).

10. *Reversed inflection or "Swedish" voice.*—When the output fundamental frequency is made to decrease as the input fundamental frequency increases and vice versa, a sort of reverse inflection is obtained, such as is characteristic of the Swedish dialect.

11. *Tremulousness or old man.*—A modification of the fundamental frequency which can produce this effect is a combination of the original fundamental frequency and a fundamental frequency differing therefrom by a few cycles per second so as to produce a wavering beat.

Vocal expression of emotion is accomplished largely or practically entirely by pitch control, and in accordance with a feature of the invention vocal emotional expression can be created or modified by artificial control of the fundamental frequency of speech or vocal sounds, for example, manual operation of controls for the fundamental frequency being made to inflect (modulate) voice sounds upwardly and downwardly at will, or vary the pitch of the synthesized speech independently of the vocal cord frequency, or raise or lower the average pitch of a voice, for instance to improve or correct inadequate or unsatisfactory or defective expression.

Similarly, in accordance with a feature of the invention, musical expression or effects can be modified or created by artificial control of the fundamental frequency of vocal sounds, for example, by manually operating controls for the fundamental frequency. For instance, musical pitch can be created or added to notes sung in a given pitch (i. e. in a monotone), by so modifying their fundamental frequencies as to make the fundamental frequencies those of notes of a musical scale. Conversely, pitch can be taken out of a scale, for example, the notes of the scale being given a monotone by modifying the fundamental frequencies so as to make them the same for all of the notes.

Also, in accordance with features of the invention, by addition or modification of pitch, or by production of a multiplicity of different fundamental frequencies at the same time, a multiplicity of voices speaking or singing the same words at the same time but not on the same pitch, or speaking or singing the same words at the same time but with different character or vocal effect, can be manufactured or created. For instance, a harmonious chorus (with almost perfect harmony) can be manufactured or created by adjusting the controls for the fundamental frequency of a single speaker so that the words he sings are reproduced with a plurality of different fundamental frequencies each controlled by his fundamental frequency but proportional to it by a different constant of proportionality, the constants of proportionality being chosen such as to give manufactured fundamentals that are musical intervals apart, e. g. octave, third and fifth; or a multiplicity of different kinds of unusual voices (ventriloquistic, etc.), with or without a naturally sounding voice, can be manufactured at the same time by adjusting the controls for the fundamental frequency of a single speaker so that the words he speaks or sings are reproduced with a plurality of different fundamental frequencies each controlled by his fundamental frequency but varying in some such manner as indicated above to give a reproduced voice having a desired characteristic or vocal effect.

Certain aspects of the invention relate to the means employed in analyzing the speech signals for information regarding their fundamental frequency, the means employed for generating the energy from which to manufacture or fashion simulations of speech signals, and the controls for the fundamental frequency of the manufactured speech.

Other objects and aspects of the invention will be apparent from the following description and claims.

Fig. 1 of the drawings shows schematically a speech frequency range reducing and restoring system embodying a form of the invention;

Fig. 2 shows a frequency measuring circuit that may be used in the system of Fig. 1;

Fig. 2A shows a curve for explaining operation of the circuit of Fig. 2;

Fig. 4 shows a relaxation oscillator circuit that may be used in place of one shown in Fig. 3;

Figs. 4A to 4G show curves for explaining operation of the circuit of Fig. 4;

Fig. 5 shows a modification of the frequency measuring circuit of Fig. 2;

Figs. 5A and 5B show curves for explaining operation of the circuit of Fig. 5; and Figs. 6 and 7 show curves for explaining operation of the system of Fig. 1 when using the frequency measuring circuit of Fig. 5.

Figure 3:
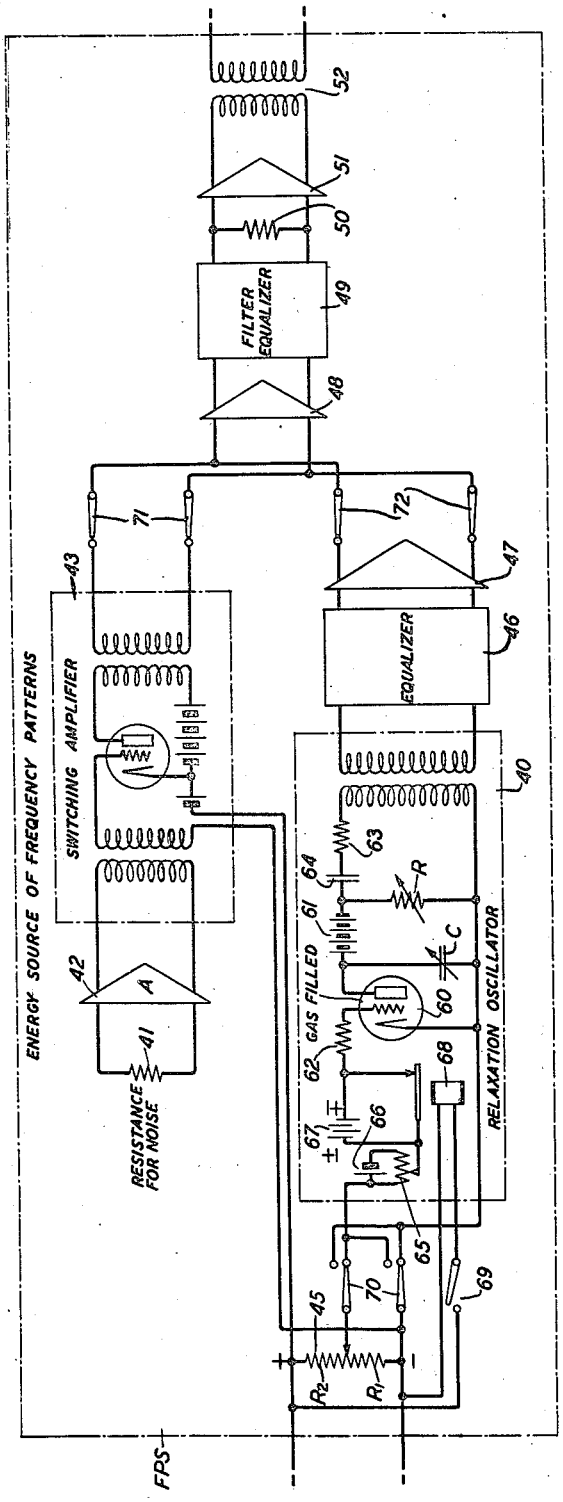
Fig. 3 shows an energy source that may be used in the system of Fig. 1.

As brought out in the patent referred to above, there are two fundamental ways of passing information from one point to another. One way may be called direct transmission of the waves of the signal containing that information. The other way is that of simulation. To the extent that information itself or the specific method of producing it can be reproduced at the receiving end, to that extent it is superfluous to transmit that information or partial information. This simulation may or may not lead to a reduction of frequency range. In general, it will lead to such a reduction whenever information is substituted at the receiving end and also whenever a simulative device is provided at the receiving end which can be controlled to regenerate all or part of the signal by a smaller frequency band than the original signal itself required before substitution.

The principle just stated is very broad and applicable to all types of communication signals. As an example, speech will be considered as discussed in the patent just mentioned. Speech signals satisfy the condition for possible frequency range reduction in an outstanding manner for in one stage of speech production, namely the muscular, there is a very simple set of controlled motions of the muscular parts making up the speech signal. Several muscular elements move to form the speech signal but the rates of motion are the slow muscular or syllabic frequency rates. As an example the lips move for ordinary speech at a cyclic rate not ordinarily exceeding 7 cycles per second for the fundamental or basic motion. Several other parts of the vocal system such as lungs, uvula, tongue and teeth move also but they too move at slow rates not ordinarily exceeding 7 complete cyclic changes per second. There are two types of change, oscillatory in nature, that have motions occurring at much higher rates than 7 cycles per second so these will be discussed at more length to show that they too have a basic rate of not over 7 cycles per second.

The first motion at a higher fundamental frequency rate is that of the vocal cords. Here the fundamental frequency for men is typically around 125 cycles per second and for women over 200 cycles per second. This motion differs from the others mentioned in that it is a natural frequency of stretched cords. The tension of the cords is controlled volitionally and can only be changed at slow muscular or syllabic rates. This is equivalent to varying the frequency of an oscillator up and down by swinging a condenser dial back and forth by hand. The output frequency is then the natural frequency of the oscillator which may be indefinitely high but the rate at which it changes up and down is limited by the slow muscular changes in the hand twisting the dial. The vocal cords not only have a high fundamental frequency but they also give a wave shape that is far from sinusoidal and, therefore, rich in upper harmonics up to several thousand cycles per second. Corresponding to the direct current battery of the oscillator the vocal cords have a steady energy source in the lung pressure from which the vocal cords derive their energy as they vibrate at their natural frequency depending on the tension to which they are stretched, and this tension can only change at the slow rates, such as 7 cycles per second.

The second type of high frequency energy source or oscillator in speech production may for convenience be called a stricture. This stricture or closing with air forced through to form a sort of hissing sound may occur between lower lip and upper teeth as for the "f" sound or between the tongue and front part of the hard palate as for "s" or at other places for other sounds. Speech sounds so produced are known as the unvoiced sounds or sometimes as the breathed sounds. Explosive unvoiced sounds like "p" and "t" are produced somewhat similarly except that the stricture is suddenly opened up. It is noticed that in all such sounds the volitional control is again applied at the low frequency muscular or syllabic rates. Thus "sh-sh" can only be repeated at about 7 times per second because of the sluggishness of the muscular system.

From the foregoing detailed discussion of the mechanics of speech sound production it is seen that the various speech sounds are produced by voluntarily controlled variations in the muscular system at slow syllabic frequency rates of 7 cycles per second or less. The important muscular elements or variables used in speech production are:

1. Lung pressure
2. Vocal cord tension and position
3. Rear mouth resonance chamber
4. Front mouth resonance chamber
5. Opening from rear to front resonance chamber
6. Opening from mouth
7. Position of uvular (opening to nasal resonance chamber)
8. Position of any stricture (near closure) in sound path Since the important muscular variables are only 8 in number it is seen that the total frequency range required to produce speech sounds in the vocal system is very limited, it being limited in fact to the number of such variables multiplied by the frequency range required to express the motion of each which may be about 14 cycles per second if the reasonable assumption is made that the fundamental rate of change plus its first upper harmonic defines the motion reasonably well.

It would be difficult so to analyze the speech sounds instantaneously as to determine directly what the important motions are. Thus, for example, it is very difficult to determine from a speech sound just what position the tip of the tongue has. However, it is reasonably simple to effect instantaneous analysis of the speech in terms of equivalent parameters. Thus the sounds can be analyzed readily into elements that are easily determined such as the power in a given frequency band and these can be reproduced readily enough. It, also, changes at the sluggish muscular rates so that if a new set of entirely independent parameters is obtained nothing is lost thereby. Again it is difficult to get an easily analyzed set of entirely independent parameters but this deficiency can readily be allowed for by using a slightly greater number of such parameters that are not quite independent.

As in the case of the above-mentioned patent, in the system shown in the drawings the set of simulative devices (or artificial vocal system to be controlled by elements or quantities characteristic of the speech sounds that it is to reconstruct or create) includes:

1. Artificial vocal cords
2. Artificial stricture
3. Artificial lungs or power level control
4. Artificial resonances These four elements make up the complete set of speech controls found in the speech organs and, furthermore, vary at syllabic or sluggish muscular frequency rates so that they make possible a considerable reduction in frequency range although the method of choosing artificial resonances by measuring the power in adjacent frequency bands does lead to the need of more such resonance simulations than would be required were a closer simulation to the human vocal system obtained.

From a slightly different point of view we can picture the regenerated signals as being produced by circuit elements having fixed and variable features. According to this point of view, only the information for controlling the variable features need be passed through the transmission medium, as the information for setting up the fixed features has been used ahead of time to construct the appropriate fixed circuit elements. This results in less information to be transmitted through the transmitting medium and, therefore, a lesser frequency range required for transmitting the information. In this point of view the variable features are the amplitude and frequency controls of the regenerated signal at the receiving end and the information transmitted is in the form of signals that may be referred to as controlling or shaping or defining signals. The fixed features are determined by a study of the basic elements in the original signal source and are set up in the form of circuit elements to simulate these. Such simulating elements used in the circuit of the drawings are the artificial vocal cords, the artificial stricture, the artificial lungs and the artificial resonances referred to above. As brought out in the above-mentioned patent, a very close analogy to this is the well-known oscillator where most of the elements are fixed but controls are provided of frequency, feedback and output.

Preparatory to describing the drawings in detail it is noted that Fig. 1 shows a speech frequency range reducing and restoring system of the general type disclosed in the above-mentioned patent having means for reducing the frequency range of speech by analyzing the speech so as to determine or measure its unknown characteristics in terms of speech-defining currents of limited frequency range, a transmitting medium (which may have a limited frequency range of transmission) for transmitting these defining currents or defining signals set up or created by the analyzing means, and means for reconstructing, restoring, simulating, or substantially reproducing the speech in response to the transmitted defining currents or signals.

In order to be a satisfactory electrical definition of the speech signals, the speech defining currents or speech defining signals which are set up to replace the speech signals should not only be sufficiently complete and unique to define the speech signals without error or confusion, but moreover should be practical and convenient, so that a simple automatic analyzing circuit can be used to create or set up the speech defining signals when a speech wave is applied. Such satisfactory definition is obtained when the speech defining signals define the speech signals in terms of (1) frequency pattern, and (2) amplitude pattern.

Frequency pattern as used here refers to the number and position of energy-bearing frequency components. There are two distinct types. In one there is a fundamental frequency and all its upper harmonics to several thousand cycles. This fundamental frequency is the rate of vibration of the vocal cords and in general is always changing up (rising inflection) or down (fall-inflection) in ordinary speech although it can be held constant by sustaining a sound. In the other type of frequency pattern there is a continuous spectrum of energy so that all frequencies are present, instead of discrete ones in a harmonic ratio, although this second type may be thought of as the limiting case of the first type when the fundamental frequency approaches zero.

Amplitude pattern as used here refers to the distribution of power with frequency from instant to instant. A smooth envelope is taken as this in connection with the frequency pattern gives a complete specification of the speech sound analyzed.

As will appear from the description of the drawings, about to be given, analyzing speech sounds on the basis of frequency and amplitude patterns is especially convenient because at the receiving or reproducing end of the system the simulating or reproducing devices are separated into two simple, easily recognizable groups. The devices required for producing the frequency patterns will be artificial vocal cords for which a relaxation oscillator is shown (as was the case in the above-mentioned patent) and an artificial stricture for which a source of resistance noise is shown (as was also the case in the above-mentioned patent). The devices required for producing amplitude patterns will be the artificial lungs controlling the total power put out and the artificial resonances controlling the relative amount in each small frequency band. By working on an absolute basis these characteristics are all handled in a single set of modulating controls shown as gain-controlled amplifiers, the artificial lungs being the power supply batteries or sources and the artificial resonances being filters or tuned networks (as was also the case in the above-mentioned patent).

Referring now to the drawings, Fig. 1 will first be described with all switches in the condition in which they are shown. Speech currents from line or circuit I energize a frequency pattern control circuit FP and an amplitude pattern control circuit AP. The frequency pattern control circuit, which comprises but one channel FP₁ when the switches of this figure are in the condition shown, discriminates as to the frequency pattern. This discrimination includes discrimination as to the fundamental frequency when there is one. The amplitude pattern control circuit branches into a number of channels, for example, ten channels AP₁ to AP₁₀ and determines what amplitude pattern we have. For simplicity, channels AP₄ to AP₉ are omitted from the drawing.

The information obtained from the speech analysis effected in these two circuits FP and AP is in the form of electrical currents which can be transmitted through any suitable transmitting medium, such for example, as lines L₀ to L₁₀, to the receiving or reproducing end of the system. This transmitting medium may have a limited frequency range of transmission, of much less width than the frequency range of the speech signals to be communicated. If desired it may be a single conductor pair or a radio link, the transmission through this medium then being, for example, on a carrier frequency basis in the general fashion shown in the above-mentioned patent.

At the receiving end of the system, in channel FP₁ the received waves act on an energy source of frequency patterns FPS so as to cause currents of the proper frequency pattern to flow from this source, and the received waves in channels AP₁ to AP₁₀ are used to control shaping networks SN₁ to SN₁₀ respectively, to give the proper amplitude pattern to the power received by these networks from the energy source FPS. We then have our reproduction or reconstruction of the original speech signal for any further transmission in the ordinary manner.

The system as shown uses a 275 cycle total transmission band in the transmission medium between the transmitting and receiving ends of the system, that is, in the lines L₀ to L₁₀. This 275 cycle band is on the basis of eleven channels, each of 25 cycle pass band. Ten of these are for amplitude pattern control and the other one is for frequency pattern control. As brought out in the above-mentioned copending application, such a system is adequate for high quality transmission of speech.

The frequency pattern control channel FP₁ will first be described with reference to its adjustment for use in natural reproduction of speech. It is a circuit for analyzing and reproducing the frequency spectrum of the source of energy in speech sounds. It is of general application, its application being by no means limited to systems of the general type described in this application for modifying speech signals. For speech applied to its input from line I it delivers an output wave that has discrete components and is of the same fundamental frequency as the input when a voiced speech sound is applied, and an output wave with a continuous spectrum when an unvoiced speech sound is applied. It performs three functions. First, at the transmitting or analyzing end of the system it derives from the speech signal the fundamental or vocal cord frequency and expresses this as a current, the amplitude or magnitude of which is proportional to the fundamental frequency. Next, at the receiving or reproducing end of the system it uses this current to control the frequency set up by a relaxation oscillator so as to get back a wave of the original fundamental frequency, rich in upper harmonics. Finally, it provides for another source of energy at the receiving end, having a continuous spectrum, when there is no fundamental in the speech. This condition occurs when sounds are unvoiced, as for example in whispering and the unvoiced consonants.

From the standpoint of the source of acoustic energy the sounds of speech may be divided into three classes:

1. *Voiced sounds.*—For these sounds the acoustic energy is derived from the vibration of the vocal cords and the frequency spectrum is characterized by discrete components.
2. *Unvoiced sounds.*—For these sounds the acoustic energy is not derived from the vibration of the vocal cords but from the passage of an air stream through a restricted aperture or from the sudden stopping or starting of such a stream of air. The frequency spectrum of such sounds is, in general, continuous and devoid of discrete components.
3. *Mixed sounds.*—For these sounds the acoustic energy is derived from both the above sources and the frequency spectrum consists of discrete components superposed on a continuous spectrum.

The frequency pattern control channel FP₁ is a circuit that analyzes speech sounds on the basis of the above classification and which, within certain limits, delivers to a load a wave whose frequency spectrum is of the same class as that of the speech sound applied to the input of the circuit.

The circuit operates so that when no signal or an unvoiced speech sound (Class 2, above) is applied to the input, thermal noise from a vacuum tube amplifier is supplied to the load. The spectrum of thermal noise is a continuous one and so is similar to that of the source of acoustic energy in unvoiced sounds but any other source with a similar spectrum could be used. When a voiced or mixed speech sound (Classes 1 and 3, above) is applied to the input, the thermal voltage is removed from the load and a wave of the same fundamental frequency as the speech sound and a discrete frequency spectrum is supplied to the load. There is a certain amount of arbitrariness in this arrangement since speech sounds of Class 1 and Class 3 both result in a reproduced spectrum with only discrete components. This distinction is not important for present purposes.

The voice analyzing circuit of the frequency pattern control channel $FP_1$, or the portion of this channel at the sending or analyzing end of the system, will first be described. It comprises a detector D which may be, for example, a full-wave copper-oxide rectifier, an attenuation discrimination network or so-called equalizer $E_1$ having its loss increasing with frequency, a frequency measuring circuit FM and a 25 cycle low pass filter $F_{30}$. The speech currents from line 1 are fed through the rectifier D, which feeds the equalizer $E_1$, which in turn feeds the frequency measuring circuit FM. This frequency measuring circuit may be any suitable circuit for delivering through the low-pass filter $F_{30}$ a direct current that depends on the number of reversals per second of direction of the voltage wave applied to this circuit and is independent of its amplitude as long as the amplitude exceeds a certain threshold value. For example, this circuit may have the form shown in Fig. 2, about to be described, this form being stable and free from singing, free from false operation at high frequencies, positive in action upon application of the input wave, and economical of plate battery power. In order to have the output current of the frequency measuring circuit controlled by the fundamental of the voice the rectifier D modulates the various harmonics to give a strong fundamental and the harmonics are suppressed by the equalizer $E_1$. The equalizer may be any suitable network having its loss increasing with frequency so as to insure that the fundamental frequency, which may vary for example from about 80 to some 300 cycles, comes out at a high power level compared to any upper harmonics that may be present. The equalizer may practically cut off transmission above a frequency in the neighborhood of 300 cycles, for example. For practical purposes the attenuation discrimination of the equalizer purifies the fundamental tone though it may vary substantially more than an octave. The level of the unvoiced sounds must be adjusted to a value too low to cause operation of the frequency measuring circuit. If desired, for this purpose a voice amplifier G, with its gain adjustable, may be provided, for example in the channel $AP_1$ as shown in Fig. 1. The direct current delivered by the frequency measuring circuit through the low-pass filter $F_{30}$ may be made substantially directly proportional to the fundamental frequency applied to the frequency pattern control channel from line 1.

The circuit shown in Fig. 2 can be used for measuring the fundamental frequency of a repeated electric wave, since its output current that would be indicated by a direct current meter fed from this circuit through a low-pass filter such as $F_{30}$ of Fig. 1 is proportional to the input fundamental frequency. In this frequency measuring circuit tubes $A_1$ and $B_1$ are grid controlled gas discharge tubes and their grid bias is such that with no signal both of these tubes are non-conducting. These tubes may be, for example, Radio Corporation of America type 885 tubes. Resistances 10 and 11 in the grid circuits of these tubes may each be of the order of several megohms, for example. The two secondary windings of transformer T are so connected that, when a wave is applied to the primary winding, if the grid of tube $A_1$ is positive with respect to its cathode the grid of tube $B_1$ will be negative with respect to the cathode of the tube $B_1$. When the signal carries the grid of $A_1$ sufficiently positive the tube will become conducting and the condenser F will charge rapidly from plate battery 12 through resistance $r$ and the plate-cathode path in the tube $A_1$. When the voltage across the condenser has risen to a certain value the plate voltage across the tube will be insufficient to maintain the discharge and A will become non-conducting. $A_1$ cannot again become conducting until the condenser is discharged, and this will happen when the applied signal has carried the grid of tube $B_1$ sufficiently positive. This cycle of operations takes place once per cycle in the case of a sine wave applied signal. Once per cycle a saw-tooth-shaped pulse of voltage appears across the resistance $r$ (during the charging of the condenser by the plate battery 12). This voltage is amplified by vacuum tube C acting as a class C amplifier. A plate battery 13 and plate circuit resistor 14 are shown in the plate circuit of this tube. The direct current that this circuit delivers through low-pass filter $F_{30}$ of Fig. 1 to line $L_0$ is proportional to the number of pulses of voltage per second or the frequency of the applied wave, since all of the pulses are of the same shape and height.

The curve 15 of Fig. 2A, plotted between grid voltage $E_g$ and time $t$ is intended to indicate what happens when overtones of the fundamental are present in the applied signal. The dotted lines show the values of the grid voltage $E_g$ of say tube $A_1$ at which tubes $A_1$ and $B_1$ will become conducting when the normal plate voltage is operative. After the tube $A_1$ has fired at 16, tube $B_1$ cannot discharge until the applied voltage is as negative as the point 17. By adjusting, with biases, the range $d$—B the degree of tolerance as regards the amount of impurity permissible in the wave to still have the circuit measure the fundamental frequency, can be controlled. If desired a manual or preferably automatic volume control circuit, for example, a constant output level amplifier such as that shown in C. H. Fetter Patent No. 1,565,555, December 15, 1925, may be employed in the frequency measuring circuit, for instance as indicated at 20 in Fig. 2. A common plate battery for tubes $A_1$, $B_1$ and C may be used, for example, as in Fig. 5, described hereinafter. If desired, tube C may be omitted, the output voltage then being taken directly from the terminals of resistance $r$ instead of across resistance 14.

The direct current delivered by the low-pass filter $F_{30}$ in Fig. 2, which may be substantially directly proportional to the fundamental frequency applied to the frequency pattern control channel from line 1, is transmitted, for example through line $L_0$, to the energy source of frequency patterns FPS, which is the portion of the frequency pattern control channel at the receiving or reproducing end of the system, or the reproducing circuit of the frequency pattern control channel, for reproducing the frequency patterns of the speech signals. The energy source of frequency patterns may be, for example, as shown in Fig. 3. As there shown, it comprises a relaxation oscillator 40 and a resistance noise source including resistance 41 and tandem connected amplifiers 42 and 43. As shown it also comprises a potentiometer or voltage divider resistance 45; an attenuation equalizer 46 and an amplifier 47 having, for example, a 20 decibel gain; and an amplifier 48 having, for example, a zero decibel gain, a filter equalizer 49, a terminating resistor 50 therefor, an amplifier 51 which may be, for example, a Western Electric Company type 9—A amplifier, and a transformer 52 for connecting this amplifier to the filters $F'_1$ to $F'_{10}$ of Fig. 1.

The relaxation type oscillator 40 is the portion of the frequency pattern reproducing circuit which generates a voltage wave of the same fundamental frequency as the original speech wave. This oscillator comprises a grid controlled gas discharge tube 60 which may be, for example, of the type referred to above as suitable for tubes $A_1$ and $B_1$. The voltage of the plate battery 61 may be 45 volts, for example; and resistances R, $R_1$ and $R_2$ may be of the order of 6,500 ohms, 3,650 ohms and 10,000 ohms, respectively, resistances 62 and 63 being high resistances, for example, 50,000 ohms each. Condenser 64 is a stopping condenser for blocking passage of direct current. The plate voltage of the tube 60 at any instant is the voltage across the condenser C. Starting with the condenser uncharged and the tube non-conducting the voltage across the condenser builds up according to $$E = E_0\left(1 - e^{-\frac{1}{RC}t}\right)$$

When E reaches a critical value, determined by the voltage on the grid, the tube becomes conducting and the condenser discharges in a fraction of a millisecond. This removes the plate voltage from the tube and is becomes non-conducting and the cycle of operations repeats itself. As the grid voltage is made more negative it takes a longer time for the condenser to build up to the discharge voltage and so the frequency of oscillation is lowered. The initial grid bias is sufficiently negative (for example, —6.3 volts) so that the tube will not oscillate. When a voice wave is applied to the frequency measuring circuit, the resulting direct current voltage across $R_1$ is poled oppositely to that of the initial grid bias on the tube and adjusted so that the circuit will oscillate for any input frequency between say, 70 cycles and 440 cycles, the circuit being adjusted so that the output frequency substantially equals the input frequency.

The voltage across the resistance R of the relaxation oscillator consists of a series of sawtooth pulses one side of which is very steep and the other side of which follows a portion of the curve $$e = E_0 e^{-\frac{1}{RC}t}$$

The equalizer 46 renders all of the harmonic components of the current wave from the relaxation oscillator 40 equal in amplitude. The filter equalizer 49 equalizes for the mid-band loss of energy source filters; and the amplifier 48 matches the impedance of this equalizer.

The functions of potentiometer 65 for grid biasing battery 66 of relaxation oscillator 40, the functions of auxiliary biasing battery 67 and short-circuiting relay 68 therefor and switch 69 in the circuit of the relay winding, and the functions of reversing switch 70 and switches 71 and 72 will be brought out hereinafter.

The continuous spectrum desired for unvoiced sounds is furnished by thermal noise from the resistor 41 and the amplifiers 42 and 43. The amplifier 43 is a switching amplifier, the thermal noise power output of this amplifier being a function of its grid bias. When no voice wave is applied to the frequency measuring circuit, the grid bias of the switching amplifier may be set at a value, for example, —9 volts, such that the thermal noise power output is adequate for creating or reproducing the continuous frequency spectrum for unvoiced sounds. Then, when a voiced sound is applied to the frequency measuring circuit, for example, a sound with a 100 cycle fundamental, the voltage drop across $R_1$ and $R_2$ changes the grid bias of the switching amplifier to some such value as —15 volts, to decrease the thermal noise output level some 70 decibels or more, for example, thus substantially suppressing the thermal noise output current at the same time that the relaxation oscillator starts to function. The optimum adjustment of the values of the elements of the filter $F_{30}$, the resistances $R_1$ and $R_2$ and the initial grid bias of the switching amplifier to secure the smoothest switching action and the greatest freedom from transients in switching back and forth between thermal noise source and relaxation oscillator, is preferably determined experimentally, for instance, with the aid of the oscillograph.

The amplitude pattern control channels are circuits which at the transmitting or analyzing end of the system measure how much power there is in the speech signal in chosen small frequency bands and transmit this information by control currents to the receiving or reproducing end where the output of the energy source of frequency patterns FPS is shaped accordingly. For transmitting a speech frequency range from 0 to 2950 cycles, for example, the speech bands chosen may be, for instance, one band from 0 to 250 cycles and nine adjacent bands each 300 cycles wide, starting at 250 cycles. These bands are selected by filters $F_1$ to $F_{10}$ in the amplitude pattern control channels $AP_1$ to $AP_{10}$, respectively. Thus, of these amplitude pattern control channels used to transmit information about the amplitude pattern, the channel $AP_1$ transmits information about the amplitudes in the speech range 0–250 cycles, the channel $AP_2$ transmits information about the amplitudes in the speech range 250 to 550 cycles, the channel $AP_3$ information about the amplitudes in the range 550 to 850 cycles, etc.

Considering channel $AP_1$, for example, the output from the 0–250 cycle speech band-pass filter $F_1$ is fed to detector $D_1$, which may be, for instance, like the detector D. The syllabic frequencies in the output from the detector are passed through a 25 cycle low-pass filter $F_{31}$ and the resulting variable direct current is passed through line $L_1$. This variable direct current is then applied to a biasing resistor $B_3$ to give a grid bias to a signal shaping network or push-pull variable gain amplifier $SN_1$, which accordingly varies its gain in amplifying the waves received from the energy source of frequency patterns FPS through 0–250 cycle speech band-pass filter $F''_1$, so that the average power in this band of waves varies in accordance with the average power in the corresponding band of the speech signals. The energy from the amplifier $SN_1$ is then fed through a 0-250 cycle speech band-pass filter $F'''_1$ to the speech receiving circuit 4, where it is combined with the outputs from nine other speech band-pass filters (of channels $AP_2$ to $AP_{10}$) to give a reproduction of the original speech signal.

It will be understood that the filters $F''_1$ and $F'''_1$ have the same pass band as filter $F_1$, and that channels $AP_2$ to $AP_{10}$ are like $AP_1$ except as to frequencies involved.

In the circuit design it is desirable to have the delay in the frequency pattern control channel and in all of the amplitude pattern control channels the same. If the frequency pattern control channel $FP_1$ tends to have more inherent delay than the amplitude pattern control channels, it is desirable to introduce a certain amount of delay in the amplitude pattern control circuit AP as is indicated by delay equalizer DE in Fig. 1.

The output of the filters $F_{30}$ to $F_{40}$ is unintelligible, rendering it difficult for unauthorized persons to tap the circuit and affording a high degree of secrecy in either wire or radio transmission. The waves transmitted, through the transmitting medium, such as lines $L_0$ to $L_{10}$, directly contain no intelligibility whatever.

Fig. 4 shows a relaxation oscillator 80 which is a modification of the relaxation oscillator 40 and may be used instead of the oscillator 40, in the energy source of frequency patterns FPS. In the oscillator 80, the capacity of condenser 81 is very large compared to that of condenser 82. For our purposes the capacity of condenser 81 can be considered infinite. In this oscillator circuit, R is a resistance in the plate circuit of the grid controlled gas discharge tube 60. This resistance is varied in response to the variation of the direct current from the frequency measuring circuit, to produce the desired control of the starting and stopping of the oscillations of the oscillator and the desired control of their frequency. The resistance R is shown as a copper-oxide rectifier.

First assuming that the resistance R is constant (in which case the fundamental frequency $f_0$ of the oscillator is constant), let 82 be uncharged so that the plate of the gas discharge tube 60 is at ground potential. Since the grid is negative the tube is then non-conducting and the condenser 82 begins to charge. When the plate of the tube 60 is charged to a sufficiently large positive potential, the grid loses control and the tube suddenly becomes conducting. The condenser 82 is rapidly discharged and the grid regains control and makes the tube non-conducting again. The cycle repeats itself continuously, with a frequency $f_0$ determined by the voltages, the value of R and the capacity of condenser 82. The voltage across R is a rip-saw-tooth wave and the output of the oscillator will contain all of the harmonics of $f_0$.

Now considering the output of the frequency measuring circuit changes, R will change and produce a corresponding change in $f_0$. Below it is shown that $f_0$ is inversely proportional to R while the amplitudes of the components are independent of R.

Let $q$ be the charge on condenser 82, $C_2$ the capacity, $i$ the current flowing through R and $C_2$, $E_{BO}$ the voltage of the plate battery 61, $E_B$ the voltage of the plate of the tube 60, $Q_0$ equal $C_2 E_{BO}$, and $t$ the time. Then if $C_2$ is initially uncharged:

$$q = Q_0\left(1 - e^{-\frac{1}{RC_2}t}\right)$$

$$E_B = \frac{Q_0}{C_2}\left(1 - e^{-\frac{1}{RC_2}t}\right)$$

$$= E_{BO}\left(1 - e^{-\frac{1}{RC_2}t}\right)$$

$$i = \frac{Q_0}{RC_2}e^{-\frac{1}{RC_2}t} = \frac{E_{BO}}{R}e^{-\frac{1}{RC_2}t}$$

Then if E is the voltage across the resistance R:

$$E = E_{BO}e^{-\frac{1}{RC}t}$$

Figs. 4A to 4D indicate, in a general way, the variation of $q$, $E_B$, $i$ and $E$ with the time $t$, for different values of R.

Let the tube discharge when the positive plate voltage reaches a value $E_{BS}$, which is determined by the grid voltage $E_c$. Then the voltage waves for two values of R are indicated in a general way in Figs. 4E and 4F, those of Fig. 4F being for the higher resistance. The period, $t_0$, is given by:

$$t_0 = RC_2 \log e \frac{E}{E_{BO} - E_{BS}}$$

and the frequency is:

$$f_0 = \frac{1}{RC_2 \log e \frac{E_{BO}}{E_{BO} - E_{BS}}}$$

The frequency is inversely proportional to $RC_2$ and if all of the circuit elements except R are held constant the frequency varies as $$\frac{1}{R}$$

The maximum and minimum voltages of the wave are:

$$E' = E_{BO}$$

and $$E'' = E_{BO}e - \log e\frac{E_{BO}}{E_{BO} - E_{BS}} = E_{BO} - E_{BS}$$

Since the voltages are independent of R and the sloping sides of the voltage waves are segments of exponential curves, the wave shape is independent of R and $f_0$. Then, with R properly controlled by the frequency measuring circuit, the oscillator can produce a wave whose fundamental frequency is equal to the input frequency applied to the frequency measuring circuit and whose frequency spectrum is constant.

The character of the resistance-voltage curve of a copper-oxide rectifier is indicated in Fig. 4G. For the purpose in hand, either the portion $ab$ in the non-conducting direction or the portion $cd$ in the conducting direction can be used to give a resistance that decreases with increasing absolute value of voltage. If a portion of the characteristic is selected for which the resistance varies as $$\frac{1}{\text{voltage}}$$

and if the direct current voltage output of the frequency measuring circuit is proportional to the input frequency, then since the fundamental frequency of the oscillator output wave varies as $$\frac{1}{R}$$

this fundamental will be proportional to the input frequency applied to the frequency measuring circuit.

While two forms of relaxation oscillator circuits have been shown responsive to the varying direct current from the frequency measuring circuit to create an alternating current wave of suitable frequency, for instance, the same frequency as that of the input to the frequency measuring circuit, it should be understood that other forms of circuits can be used. For example, the direct current can be used to control the tuning inductance or capacity of an oscillator and so vary its frequency, variation of capacity (as for instance, movements of a condenser transmitter diaphragm) ordinarily being most convenient, especially when a beat frequency oscillator is used.

As brought out above, for obtaining normal reproduction of speech, the adjustment of the system of Fig. 1 as described above, especially the adjustment of the circuit elements of the frequency pattern control channel FP₁, for instance the circuit of the relaxation oscillator, may be such that when a voice wave is applied to the frequency measuring circuit the varying fundamental frequency of the reproduced or reconstructed speech substantially equals the varying fundamental frequency of the original speech, or in other words the value of the ratio between the fundamental frequency set up at the reproducing end of the system and the fundamental frequency of the input at the analyzing end is maintained at unity. However, as mentioned above, the system is provided with manually or automatically operated controls whereby the ratio may be made to undergo changes or deviations from unity, or the fundamental frequency of the speech or vocal sounds may be made to undergo modifications, for example for producing odd voice effects, such for instance as those listed above under the heading "Voice imitations", or for producing from a single voice a multiplicity of voices with their fundamentals differing in pitch, or for producing other prescribed modifications in the speech or vocal sound effects. One such control is the variable resistance R of the relaxation oscillator 40 shown in Fig. 3. Another is the variable condenser C of that oscillator. Either or both of these can be adjusted, for example, manually, for adjusting or varying the fundamental frequency of the relaxation oscillator. Still other controls are the manually adjustable contact of the potentiometer 45 and the manually adjustable contact of the potentiometer 65 of the grid biasing battery 66 for the oscillator 40, either or both of these contacts being adjustable to adjust or vary the frequency of the oscillator.

Figure 3B:
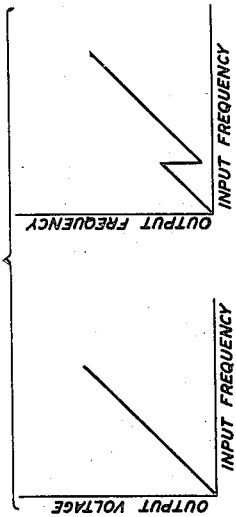
Figs. 3A and 3B show curves for explaining operation of the circuit of Fig. 3.
Figure 3A:
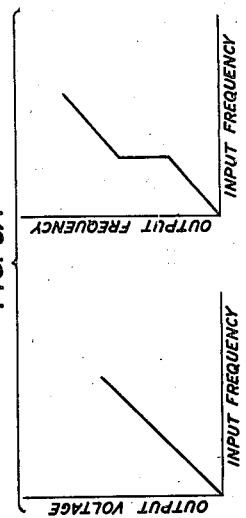

Another control is an automatic control effected by the relay 68 in the circuit of the relaxation oscillator 40 when the switch 69 is closed. The relay normally short-circuits the auxiliary grid biasing battery 67 for the tube 60. The battery may be poled to add either a negative biasing voltage or a positive biasing voltage. When the voltage transmitted from the frequency measuring circuit over line L₀ to the potentiometer 45 exceeds a chosen value the additional bias from battery 67 will be thrown into the grid circuit of the oscillator 40. This will give a discontinuous characteristic such as indicated in Fig. 3A if the added bias is negative, and such as indicated in Fig. 3B, if the added bias is positive.

Still another control is the reversing switch 70 in the input circuit of the oscillator 40. When this switch is set on its upper contacts (and the potentiometer 65 properly reset so that the normal bias is less negative than before), the inflection of the speaker's voice is inverted in the reproduced or reconstructed speech. With the switch closed on its upper contacts, the system may be adjusted, for example, so that when the speaker intones at his mean fundamental frequency the reconstructed speech has the same frequency, but when he inflects upward the fundamental frequency in the reconstructed speech inflects downward, and when he inflects downward it inflects upward. For example, in one adjustment of the system, in put fundamental frequencies of 50, 100, 124, 150 and 200 cycles gave output fundamental frequencies of 210, 145, 124, 100 and 65 cycles, respectively. Talking over the system with this adjustment produced speech of good intelligibility but the speaker was given a decided Swedish accent, emphasizing the fact that the inflection (melodic line) in spoken English is in general reversed in trend from its trend in Scandinavian languages.

Any of the controls described above can be used with any of the others of these controls.

From the foregoing description it is seen that by properly adjusting the biasing voltage and other circuit constants the output frequency of the relaxation oscillator can be made almost any prescribed function of the frequency of the input to the frequency measuring circuit. The apparatus can be used as a frequency multiplier or a frequency divider, not being limited to integral multiplying or dividing factors; or it can be used as a frequency inverter or any combination of these things. Moreover, still further flexibility is obtained when the frequency measuring circuit is as indicated in Fig. 5 now to be described.

Fig. 5 shows a frequency measuring circuit FM' which can be substituted for circuit FM in the system of Fig. 1, and which is like the system FM shown in Fig. 2 except that in the circuit FM' a common plate current source 12' for the tube C and the tubes A₁ and B₂ is used, instead of the separate sources 12 and 13 shown in Fig. 2, and in the circuit FM' a low-pass filter or equalizer network 82 can be switched in or out of circuit by switches 83, 84 and 85. With the network in circuit, if the frequency measuring circuit FM' has an output voltage characteristic as shown in Fig. 5A, then the input-output frequency curve for the circuit FM' and the relaxation oscillator will be as also shown in Fig. 5A. By making the cut-off of the filter 82 steeper, curves as shown in Fig. 5B can be secured.

With the circuit adjustment for the curves of Fig. 5A, reversing the polarity of the voltage when it is applied to the grid or control circuit of the relaxation oscillator gives the characteristic indicated in Fig. 6. The reversal can be accomplished, for example, by operating the reversing switch 70.

Similarly, with the circuit adjustment for the curves of Fig. 5B, operating the reversing switch 70 can give the curves indicated in Fig. 7.

By operating switch S₄ of Fig. 1 to connect the input terminals of the frequency measuring circuit to the variable frequency oscillator O, the fundamental frequency or the pitch of the reconstructed speech can be adjusted or varied independently of the vocal cord frequency, for example by manually adjusting or varying the frequency of the oscillator O. For instance, by increasing the frequency of the oscillator O the speech or vocal sounds can be raised in pitch or can be inflected upward, and by decreasing the frequency of the oscillator O the speech can be lowered in pitch or inflected downward.

If desired S₄ can be opened, and the grid bias (and other circuit constants) of the relaxation oscillator 40 can be adjusted to fix the fundamental frequency of the oscillator at a chosen value. Then by opening switches 71 in the output circuit of the switching amplifier 43, or switches 72 in the output circuit of the relaxation oscillator 40, the output of the energy source of frequency patterns can be made to have either a discrete spectrum with the fundamental of the chosen fixed value or a continuous spectrum. With the continuous spectrum, ordinary speech signals applied to the system are reproduced or reconstructed with good intelligibility but as a whisper. With the discrete spectrum, and with its fundamental frequency fixed at say, an average vocal cord frequency, ordinary speech signals applied to the input of the system are reproduced or reconstructed with good intelligibility but in a monotone; and if the fixed fundamental frequency chosen is rather high, the reproduced speech sounds very much like the chant of a priest. The monotone or chant effect can also be obtained, for example, by opening switches 71 and closing switches 72 and then closing switch 74 on its upper contacts, with the frequency of oscillator O fixed.

If desired, speech or vocal sounds applied to the system can be reconstructed with the switch S₄ either open or closed on its upper contacts, and with both the switches 71 and the switches 72 closed, so that the energy source of frequency patterns supplies energy from the resistance noise source and energy from the relaxation oscillator at the same time.

In Fig. 1, additional frequency pattern control channels FP₂ and FP₃, which may be like channel FP₁, can be connected in parallel with channel FP₁ by switches S₁ and S₂. These additional channels can be used, for example, for addition or modification of the pitch of speech or vocal sounds by production of a plurality of fundamental frequencies at the same time, in the reconstructed speech or vocal sounds. For instance, with channel FP₁ adjusted so that the fundamental frequency of its relaxation oscillator will be the same as that of the voice, channels such as FP₂ and FP₃ can be adjusted so that the fundamental frequencies produced by their relaxation oscillators will be musical intervals higher, as for example, a third and a fifth higher (or lower), respectively. Then when a person sings into the system, the output of the system is a harmonious chorus.

If desired, instead of adjusting channel FP₁ to reproduce the voice in its natural pitch, a voice channel VC can be provided by closing switches S₃; and then the channel FP₁ can be used as an additional channel as in the case of channels FP₂ and FP₃. Thus, for example, channel VC can cause reproduction of the voice with the fundamental at its normal frequency, and channels FP₁, FP₂ and FP₃ can respectively cause its reproduction with the fundamental an octave, a third and a fifth above normal. A delay equalizer DE₁, whose function corresponds to that described for equalizer DE, is shown in channel VC; and an adjustable attenuating network AN is shown in this channel for controlling the transmission level of its output.

Another example of use for this channel VC can occur in production of the voice imitation referred to above as a tremulous voice or old man's voice. This effect can be produced, for instance, by transmitting through channel VC a little of the original (ordinary) voice, and using channels VC and FP₁ for control of the fundamental frequency in the reconstructed speech. For example, channel FP₁ can be adjusted so that the varying fundamental frequency it yields differs by a few cycles from that of the original voice, the two fundamentals producing a wavering beat. However, if desired, instead of using the channel VC, one of the channels such as FP₂ or FP₃ can be used, such channel then being adjusted so that its fundamental output frequency is the same as that of the original voice.

If desired the increase in fundamental frequency noted above as used in producing an imitation of a drunken man's hiccup, can be obtained by adjusting the frequency measuring circuit so that it operates at about 100 per cent higher frequency than normal due to the higher harmonics adding an additional pulse each period for the frequency measuring circuit to count. This adjustment can be obtained by decreasing the range C—B indicated in Fig. 2A, so that after tube A₁ has first fired it fires again before the grid voltage reverses. Thus, tube A₁ fires twice before the applied voltage reaches the negative value corresponding to the time at which tube B₁ discharges.

With the switches of Fig. 1 in the conditions in which they are shown, the above-mentioned substitution of continuous for discrete spectrum when the input fundamental frequency is weak, to obtain the imitation of the voice breaking in an adolescent, can be effected for example by adjusting the channel FP₁ so that the fundamental frequency sometimes fails to render the switching amplifier 43 inoperative and render the relaxation oscillator operative, because the fundamental is too weak to cause this switching operation to take place. This adjustment may be made for instance with the contact of potentiometer 65 or the contact of potentiometer 45, or both.

It is mentioned above that for obtaining a voice imitation of a crying child the system may be adjusted so that at the higher values of input fundamental frequency the output fundamental frequency increases much more than directly proportionately to the input fundamental frequency, even reaching values at which transmission is interrupted; and it may be noted that such interruption occurs when the biasing voltages applied to the switching amplifier 43 and the relaxation oscillator 40 from potentiometer 45 are sufficient to render the amplifier 43 inoperative and at the same time leave the relaxation oscillator 40 inoperative.

What is claimed is:

1. The method of controlling the character of speech which comprises artificially modifying the fundamental period of the speech relative to the speech duration, and at the same time maintaining the modified fundamental frequency of the speech a variable frequency which is a continuous function of the original fundamental frequency.

2. The method which comprises artificially modifying the fundamental frequency of speech for a given frequency distribution of the speech power with time, and at the same time maintaining the modified fundamental frequency variable in such manner that it is a continuous function of the original fundamental frequency.

3. The method which comprises artificially modifying the fundamental frequency of speech for a given amplitude pattern of the speech and at the same time maintaining the modified fundamental frequency variable in such manner that it is a continuous function of the original fundamental frequency.

4. The method of operating upon speech which comprises reproducing the speech and varying the relation of the reproduced fundamental frequency of the speech to the rapidity of the reproduced speech from the relation existing between the original fundamental frequency and the rapidity of the original speech, and at the same time maintaining the reproduced fundamental frequency variable.

5. The method of controlling the character of speech which comprises reproducing the speech in substantially its original rapidity while reducing the varying fundamental period of the speech at least approximately fifty per cent as compared to the original varying fundamental period.

6. The method which comprises reproducing speech with substantially unchanged frequency distribution of the speech power with time, while translating the varying fundamental frequency of the original voiced sounds to a varying fundamental frequency for the reproduced speech at least approximately double the original fundamental frequency for corresponding time elements of the speech.

7. The method which comprises increasing and decreasing the varying fundamental period of speech relatively to its varying value in the normal speech, and at the same time maintaining the fundamental period smoothly variable between different values and maintaining the rapidity of the altered speech substantially that of the normal speech.

8. The method of producing speech of character different from a given character of speech which comprises continuously increasing and decreasing the fundamental frequency for the altered speech as the fundamental frequency of the speech of given character continuously decreases and increases, respectively.

9. A system for synthesizing vocal sounds, comprising a plurality of wave sources of different fundamental frequency each generating a complex wave that has a discrete energy spectrum and has a number of current components of substantially equal amplitude including the fundamental component and harmonics thereof, means for combining said complex waves to form a resultant wave, and means for relatively varying the average power in frequency subbands of said resultant wave in accordance with the variations in average power in corresponding frequency subbands of the vocal sounds to be created.

10. A wave translating system comprising a plurality of wave sources each generating a complex wave and each having voltage responsive means responsive to direct current voltage for controlling the fundamental frequency of the source, means for combining said complex waves, and means for deriving from a speech wave a plurality of direct current voltages each having its magnitude a different prescribed function of the frequency of the fundamental component of the speech wave and supplying said derived voltages to said voltage responsive means of said sources respectively.

11. The method of enabling a person to sing the same piece in a plurality of voices at the same time comprising analyzing the singer's voice for its fundamental pitch and amplitude pattern characteristics, generating a plurality of fundamental frequency waves under control of said fundamental pitch and differing each from each by a musical interval, and synthesizing wave products from each of said fundamental waves simultaneously in accordance with said amplitude pattern characteristics.

12. The method of producing multiple voice effects comprising producing under control of a voice wave, a plurality of sets of waves representing respectively the harmonics of fundamental waves differing from each other in frequency by a musical interval or musical intervals, maintaining continuous control of the frequencies of each set of waves in accordance with the fundamental voice frequency, and simultaneously varying the frequency-amplitude relations of all of said sets of waves under control of said voice wave.

13. The method comprising analyzing a voice wave for its fundamental frequency and amplitude pattern characteristics, deriving from said voice wave at least one other wave having a frequency differing from the fundamental frequency at all times by a musical interval, generating waves having frequencies that are harmonically related respectively to said fundamental frequency and to the frequency of said other wave, and controlling the amplitude-frequency distribution of said generated waves in a common output in accordance with said amplitude pattern characteristics.

14. In a system for creating from the voice of a singer during his song one or more additional voices that harmonize with his own as he sings, means for producing under control of the singer's voice a plurality of complex waves each comprising a component of fundamental frequency smoothly varying between different values and components which are harmonics of said fundamental component, with the fundamental components a musical interval apart and each a continous function of the fundamental frequency of the singer's voice and at least one of them a musical interval from the fundamental frequency of the singer's voice and with each fundamental component of said complex waves approximately equal in power to each of its own harmonics, and means for applying under control of the singer's voice relatively varying amplitude modulating controls to groups of said components of said complex waves falling in different frequency regions, respectively.

15. In a system for artificially adding to vibrations that represent a voice singing different sounds and include a component of varying fundamental frequency and components which are harmonics thereof, vibrations that represent a second differently pitched voice singing said sounds in consonance with the first voice, means for deriving from said first-mentioned vibrations a complex wave having a second varying frequency fundamental component constantly a musical interval different in frequency from said first fundamental component and having harmonics of said second fundamental component, with the amplitudes of the components of said complex wave independent of the amplitudes of the components of said first-mentioned vibrations, and means for producing in said components of said complex wave amplitude changes with time whose relative differences for different frequency regions are approximately the same as the relative differences for those regions of the amplitude changes with time occurring in the components of said first-mentioned vibrations.

16. In a system for adding pitch to that of a singer to cause him, as he sings, to carrying a plurality of melodic parts, means for producing from the singer's voice a plurality of complex waves each comprising a component of varying fundamental frequency and components which are harmonics of said fundamental component, with the fundamental components a musical interval apart and continuous functions of the fundamental frequency of the singer's voice and with each fundamental component of said complex waves approximately equal in amplitude to each of its harmonics, and means for producing in the components of said waves, amplitude changes with time whose relative differences for different frequency regions are the same for said two waves.

17. The method of creating vocal harmony with vibrations that represent a voice and include as one component a varying fundamental frequency and as other components harmonics of said fundamental frequency, which method comprises producing under control of said vibrations a complex wave having as one component a second varying fundamental frequency different from the harmonics of the first-mentioned fundamental frequency and constantly a musical interval from the first-mentioned fundamental frequency and having as other components harmonics of said second fundamental frequency, the magnitudes of said components of said vibrations changing by factor whose dependence on the frequency of the changing component undergoes variations with time, and said method further comprising altering the magnitudes of said components of said complex wave by factors whose dependence on the frequency of the altered component undergoes substantially the same variations with time as said dependence of said first-mentioned factors and combining effects of said altered components and said components of said vibrations.

18. A system for synthesizing vocal sounds to enable a person to sing the same piece in a plurality of differently pitched harmonious voices at the same time, comprising a plurality of wave sources each having a different varying fundamental frequency, each source generating under control of the natural voice of the singer a complex wave that has a discrete energy spectrum and has a number of current components of substantially equal amplitude including the fundamental component of varying frequency and harmonics thereof with the fundamental component of at least one of said complex waves a musical interval different in frequency from the varying frequency of the fundamental component of the natural voice of the singer, means for combining said complex waves to form a resultant wave, and means for relatively varying the average power in frequency subbands of said resultant wave in accordance with the variations in average power in corresponding frequency subbands of the natural voice of the singer.

19. A system for synthesizing vocal sounds to create from articulate sounds of one voice the same articulate sounds in a plurality of concurrent voices that differ from each other in quality, comprising a plurality of wave sources of different fundamental frequency each generating a complex wave that has a discrete energy spectrum and has a number of current components of substantially equal amplitude including the fundamental component and harmonics thereof, means for combining said complex waves to form a resultant wave, and means for relatively varying the average power in frequency subbands of said resultant wave in accordance with the concurrent variations in average power in corresponding frequency subbands of said articulate sounds of said one voice.

20. In creating from articulate sounds of one voice the same articulate sound in a plurality of concurrent voices that differ from each other in character and at least one of which is synthetic, said first-mentioned sounds having a fundamental vibration component of the varying fundamental frequency of the vocal cords active in producing the first-mentioned sounds, the method which comprises reproducing the first-mentioned sounds and varying the relation of the reproduced fundamental frequency for the reproduced sounds to the rapidity of reproduction from the relation existing between the frequency of said fundamental vibration component and the rapidity of production of said first-mentioned sounds, while at the same time maintaining the reproduced fundamental frequency variable, and combining said reproduced sounds with said first-mentioned sounds.

21. In manufacturing from one voice a plurality of voice concurrent with each other but differing from each other in vocal quality, the method of controlling the character of articulate voice sounds which comprises artificially modifying their fundamental period relatively to their duration, and at the same time maintaining their modified fundamental frequency a variable frequency which is a continuous function of their original fundamental frequency, and adding to the sounds thus modified the sounds in their unmodified state.

ROBERT R. RIESZ.